United States Patent
Beyer et al.

(10) Patent No.: US 7,698,295 B2
(45) Date of Patent: Apr. 13, 2010

(54) METHOD AND APPARATUS FOR HANDLING A LET BINDING

(75) Inventors: Kevin Scott Beyer, San Jose, CA (US); Edison Lao Ting, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/684,410

(22) Filed: Mar. 9, 2007

(65) Prior Publication Data
US 2008/0222187 A1 Sep. 11, 2008

(51) Int. Cl.
*G06F 17/30* (2006.01)
(52) U.S. Cl. .................. 707/102; 707/3; 707/101
(58) Field of Classification Search ............. 707/3–5, 707/100–102
See application file for complete search history.

(56) References Cited

U.S. PATENT DOCUMENTS

| | | | |
|---|---|---|---|
| 7,031,956 B1 * | 4/2006 | Lee et al. ................. | 707/3 |
| 7,162,485 B2 * | 1/2007 | Gottlob et al. ............. | 707/102 |
| 7,516,121 B2 | 4/2009 | Liu et al. | |
| 2004/0010752 A1 | 1/2004 | Chan et al. ............... | 715/513 |
| 2005/0108209 A1 | 5/2005 | Beyer et al. ............... | 707/3 |
| 2005/0289125 A1 | 12/2005 | Liu et al. .................. | 707/3 |
| 2006/0235839 A1 | 10/2006 | Krishnaprasad et al. | |
| 2007/0174242 A1 | 7/2007 | Josifovski et al. | |

OTHER PUBLICATIONS

Dario Colazzo, "Path Correctness for XML Queries: Characterization and Static Type Checking", Ph.D. Thesis, Jul. 2004.
"XQuery FLWOR Expressions" XQuery FLWOR, viewed Mar. 9, 2007. http://www.w3schools.com/xquery/xquery_flwor.asp.
"XPath Syntax" XPath Syntax, viewed Mar. 9, 2007. http://www.w3schools.com/wpath/wpath_syntax.asp.
Office Action mailed Jul. 21, 2009 in case U.S. Appl. No. 11/684,425.

* cited by examiner

*Primary Examiner*—Yicun Wu
*Assistant Examiner*—Huawen Peng
(74) *Attorney, Agent, or Firm*—Kunzler Needham Massey & Thorpe

(57) ABSTRACT

An apparatus and method for handling a LET binding used in a WHERE clause of an XQuery FLWOR expression during an XML pivot join procedure. XPath steps under a LET binding are identified and marked as bindings. During a match graph construction phase of the pivot join procedure, the bindings are linked to a first common non-LET binding ancestor, while traversing from the bottom up. A location identifier for each binding is truncated to the location identifier of the first common non-LET binding ancestor to create a truncated location identifier. The truncated location identifier is compared to a node identification of a FOR binding of the XQuery FLWOR expression. A match of the node identifications will qualify the XML document and the XML document is returned by the XML pivot join procedure.

4 Claims, 11 Drawing Sheets

```
      Paths Table z-e-aa-cc        ...
z-e-x-p-v-b      z-e-x-q-v-b
z-e-x-p-v-c      z-e-x-q-v-c
z-f-x-p-v-b      z-f-x-q-v-b
z-f-bb           z-e-x-p-a
z-ee             z-f-x-q-a
z-e-x-q-a        ...
...
```

METHOD AND APPARATUS FOR HANDLING A LET BINDING

CROSS-REFERENCES TO RELATED APPLICATIONS

This application is related to patent application Ser. No. 11/336,140 entitled "QUERY EVALUATION USING ANCESTOR INFORMATION" and filed on Jan. 20, 2006 for Edison, et al.

BACKGROUND OF THE INVENTION

1. Field of the Invention

This invention relates to XML pivot joins and more particularly relates to handling a LET binding used in a WHERE clause of an XQuery FLWOR expression during an XML pivot join procedure.

2. Description of the Related Art

XPath and XQuery are two common languages used to query an XML document. XPath is a path expression language for selecting data within XML documents. XQuery is a language for querying, transforming, and constructing XML data. An expression is a string of unicode characters which may be constructed from keywords, symbols, and operands. XPath allows expressions to be nested. XQuery uses XPath expression syntax to address specific parts of an XML document and is semantically similar to structured query language (SQL). The SQL-like XQuery syntax uses "For, Like, Where, Order by, and Return" clauses in a "FLWOR" expression.

XPath analyzes an XML document as an XML tree by representing each element of the XML document as a node in the XML tree. The XML tree may include parent-child nodes that directly correspond to the nested elements in the XML document. For more information regarding XPath and XQuery please visit their standards web pages which currently reside at http://www.w3.org/TR/xpath20/ and http://www.w3.org/TR/xquery/ respectively.

An XML pivot join procedure provides efficient filtering of XML documents that satisfy an XPath or XQuery expression. The XML pivot join procedure uses an XML index scan to filter an index for each leg in an expression. For example, given an XPath expression, "/a/b[(c=5) AND (d=6)]," and a collection of XML documents, an index will be filtered by performing an XML index scan on the index relating to "/a/b/c=5" (the first leg) as well as on the index relating to "/a/b/d=6" (the second leg). Each index will contain information from a qualifying XML document, which information includes the qualifying path, the XML document where the path is located, the node identification of the path, and the value received from the XML document. The XML pivot join procedure will "AND" the index scans thereby advancing the scan of one index based on the information of another.

Several structures are created during the XML pivot join procedure. From the query, a query tree is generated that describes the query in tree representation. Also, a paths table is created during the XML pivot join procedure to describe every unique path in the collection of XML documents. By nature, the paths table includes paths that are both relevant and non-relevant to the query. So, to summarize the relevant paths, a paths tree is created. Entries from the paths table are matched against the query tree and qualifying paths are combined to form the paths tree. A match graph is constructed by finding paths in the paths tree that match steps in the query tree. These structures are used at strategic points throughout the XML pivot join algorithm to identify qualifying documents.

XML pivot joining from an XPath expression produces expected results. However, XML pivot joining from an XQuery FLWOR expression may not produce expected results. That is, when pivot joining from an XQuery FLWOR expression, the information to be propagated may not compute properly. For example, given the XQuery FLWOR expression "FOR $a in doc( )//a LET $b in $a//b WHERE $b/c=5 and $b/d=6 RETURN $a," the LET binding $b describes the sequence of one or more "b" nodes underneath "a" nodes of a document. So, the XQuery FLWOR expression searches for "c" nodes and "d" nodes under any of the "b" nodes that are under "a." In other words, the "c=5" match and the "d=6" match does not necessarily need to be under the same "b" node.

Detrimentally, certain XML documents that, in theory, should satisfy the XQuery FLWOR expression do not. When the XML pivot join algorithm applies the "AND" operation on the indexes, evaluation of the subsequent leg of the expression relies on the information obtained from the evaluation of the prior leg. So, if the information obtained from evaluating the prior leg results in "Document 1" satisfying the "/a/b/c=5" path, then the subsequent expression would rely on that information to find the "/a/b/d=6" path by starting at the node location for the path "/a/b." This necessitates having the "c=5" match and the "d=6" match under the same "b" node. But, when evaluating an XQuery FLWOR expression, the "c=5" match and the "d=6" match are not required to be located under the same "b" node. The "c=5" match and the "d=6" match can be under different parent nodes to qualify a document; however, current implementations of the XML pivot join procedure exclude the document.

FIGS. 3 through 10 are provided as an example of the XML pivot join procedure. Using the XML documents in FIG. 3 and an XPath query: //x[.//v[b="b" and c="c"] and .//a="a"], a query tree (see FIG. 4) is constructed. A double bar represents a descendant axis and a single bar represents a child axis. A paths table (see FIG. 4) is also constructed. The paths table describes all the unique paths within the collection of XML documents in FIG. 3. To summarize all of the paths relevant to the query, a paths tree is created. The query tree facilitates parsing the XPath query into linear XPaths. The linear XPaths derived are //x[.//v[b="b"]], //x[.//v[c="c"]], and //x[.//a="a"].

Paths in the paths table matching the linear XPaths derived from the query tree comprise the paths tree. Thus, the paths tree summarizes all the unique paths in the collection of XML documents that are relevant to the XPath query. XML index entries are created for each linear XPath in the XPath query. Each index entry includes a path, which is the unique path that matched the linear XPath; a value, which is the value of the last document node in the path; a document identifier, which is the document identifier of the XML documents that contains the path; and a node identifier, which is the identifier of the node in the XML document that is in the path.

FIG. 5 depicts the XML index entry's relations to the XML documents and paths of the paths tree. For the first entry, the path z-e-x-p-v-b describes the first matching (unique) path for the linear XPath //x/v/b. For discussion purposes, the labels within the path with numbers have been subscripted in FIG. 5 to show the unique instances of that label. For the linear XPath //x/v/b for example, there are a number of matching paths: z-e-x-p-v-b is the first matching path, so it is subscripted with "1"; the paths tree has the z-e-x-p-v-b path so it is subscripted as $z\text{-}e\text{-}x_1\text{-}p_1\text{-}v_1\text{-}b_1$. The second match for //x/ v/b is z-e-x-q-v-b, so it is subscripted as z-e-$x_1$-$q_1$-$v_2$-$b_2$. The "$v_2$" indicates that this path is the second unique path for "v," and "$b_2$" indicates that this path is the second unique path for "b."

From this point on, the paths that match a linear XPath will be referenced using the last subscripted label. For example, to refer to the path z-e-$x_1$-$p_1$-$v_1$-$b_1$ above, the reference will be to the "$b_1$" path. Likewise, for the path z-e-$x_1$-$q_1$-$v_2$-$b_2$, the reference will be to the "$b_2$" path.

The first entry in the XML index in FIG. 5 indicates that the "$b_1$" path has the value "b" at document 1 at nodeID 1.1.1.2.1.1.1. An explanation of nodeIDs may begin at document 1. Node "z" has nodeID 1.1. Node "e" has nodeID 1.1.1, node "x" has 1.1.1.2 (because node "aa" is 1.1.1.1). Node "p" has 1.1.1.2.1, node "v" has 1.1.1.2.1.1 and node "b" has 0.1.1.2.1.1.1. Note that nodeIDs are ordered, that is 1.1.1<1.1.2<1.1.2.1 and so on, and that parent nodeIDs are easily computed from any descendant. That is from "$b_1$" which has nodeID 1.1.1.2.1.1.1, the nodeID of "$x_1$" can be computed by truncating the nodeID from 7 digits to 4 digits (7 nodes along the path to the "b" document node, and 4 nodes along the path to the "x" document node). So, the nodeID of "$x_1$" is 1.1.1.2.

Note that for the "$b_1$" path, there are a number of XML index entries. The first "$b_1$" entry points to document 1, nodeID 1.1.1.2.1.1.1. The second "$b_1$" entry points to document 2 nodeID 1.1.1.1.1.1.1. This says that the indexes have found the "$b_1$" path in both document 1 and document 2. From here on, instead of showing the XML index entries and their paths and locations, the subscripted paths along the xml document paths will be shown (see FIG. 6).

In FIG. 6, the matches for the linear XPath //x//v/b can easily be seen. There is a path "$b_1$" at document 1, "$b_3$" at document 1, "$b_1$" at document 2, and so on. For the linear XPath //x//v/c, there is a path "$c_1$" at document 1, "$c_1$" at document 1, "$c_1$" at document 2, and so on. For the linear XPath //x///a, there is a path "$a_2$" at document 2, "$a_2$" at document 3, "$a_4$" at document 4, and so on. Further referencing the way the algorithm advances the XML index scans will occur by saying that the "$b_1$" scan is currently at the first "$b_1$" in document 1, then at the first "$b_1$" at document 2 and so on. The XML pivot join procedure has one index scan open for each unique path. So, the "$b_1$" paths use one index scan, the "$c_1$" paths use one index scan, the "$b_2$" paths uses one index scan, and so on.

In FIG. 7, a query tree and a paths tree are used to construct a match graph. The match graph is constructed by finding matching paths in the paths tree with steps in the query tree. The "$b_1$" node in the match graph, for example, signifies the match between the "$b_1$" path in the paths tree with the "b" step in the query tree. The match graph is used to remember document and node locations while performing the XML index scans. For example, if the index scan for "$b_1$" is advanced and the index scan returns document 1, the location will be remembered, document 1 (and the nodeID of the "$b_1$" match) in the match graph node "$b_1$." The match graph node "$b_1$" is at location document 1.

A running example may be useful as it shows the XML pivot join procedure in detail. The following examples will show snapshots of the match graph and describe how the document locations are computed and how the index scans are advanced. The diagram of the xml documents in FIG. 6 will be used repetitively to help track what is being pointed to with the XML index scans.

In FIG. 8, the progress of the match graph occurs from left to right. The leaves of the match graph correspond to the index scans. For the initial match graph on the left of FIG. 8, the "$b_1$" index scan is at "doc1." The "$c_1$" index scan is also at "doc1." The "$b_2$" index scan is at "doc2," the "$c_2$" index scan is at "doc2," and the "$a_1$" index scan is at "doc5." The locations for the index scans show that the first "$b_1$" path is at document 1, the first "$c_1$" path is at document 1, the first "$b_2$" path is at document 2, the first "$c_2$" path is at document 2, the first "$a_1$" path is at document 5, and so on.

In the match graph snapshot to the right, the location of "$b_1$" has been truncated to the level of "$v_1$." It is apparent that this matched the nodeID computed from the truncation of the nodeID of "$c_1$" to the level of "$v_1$." This match is depicted in location with an asterisk (*) at "$v_1$." This says that a "$b_1$" path and a "$c_1$" path are found to have the same "$v_1$" ancestor at document 1, as can be seen in FIG. 6. A similar occurrence is seen for "$v_2$." To compute for the location of "$x_1$", the minimum locations of (a1, a2) and minimum locations of (v1, v2) are taken, then the maximum of these minimums is taken. So "$x_1$" is at doc2. To compute for the location of "z," take the minimum of (x1 and x2), so "z" is at doc2. Note that neither "$x_1$" nor "z" has the asterisk because "$x_1$" does not have a "v" match and an "a" match under the same "x" match.

Now that all the index cursors at the leaves of the Match Graph have been advanced once (without returning results), the cursors may again be advanced. The initial match graph (the match graph on the left) in FIG. 9 now shows that the "$b_1$" index cursor has been advanced to doc3 based on the maximums of the ancestor matches. In FIG. 9, doc2+ depicts the fact that the XML pivot join procedure advanced the "z" location to some location just above doc2, so the cursors on the leaves can be advanced beyond its previous location. In other words, the location of the "z" match needs to be advanced beyond doc2. By advancing "$b_1$" to doc3, the subsequent match graph (the one on the right) in FIG. 9 is realized and the ability to compute the location of "$x_1$" based on max(min(v1, v2), min(a1, a2)) is achieved. Here we see that there is an "$a_2$," a "$b_2$," and a "$c_2$," at doc2 that have the same "$x_1$" ancestor, while "$b_2$" and "$c_2$" have the same "$v_2$" ancestor.

So, now "$x_1$" has the asterisk (*). The location of "z" is computed from min(x1, x2) and the doc2 for "z" is received. A result for the XPath //x[.//v[b and c] and .//a] may be returned because a "$b_2$" and a "$c_2$" under the same "$v_1$" has been found and the "$v_1$" and "$a_2$" have the same "$x_1$" ancestor. So, the first match for the query //x[.//v[b and c] and .//a] is document 2.

Advancing the location of "z" to doc2+ to advance the index scans is required. This time a "$b_4$" and a "$c_4$" is found at document 5 with the same "$v_4$," and an "$a_3$" at document 5 with the same "$x_2$" as "$b_4$." So, document 5 can be returned as a match for the query //x[.//v[b and c] and .//a]. This example of the XML pivot join procedure was applied to an XPath query. The XML pivot join procedure produces expected results when applied to an XPath query. However, as noted above, desired results are not produced when the XML pivot join procedure handles a LET binding used in a WHERE clause of an XQuery FLWOR expression.

Using the collection of XML documents in FIG. 6 and an XQuery FLWOR expression: "for $x in doc( ) //x LET $v in $x //v WHERE $v /b="b" and $v /c="c" and $x //a="a" RETURN $x;", the undesired results will be apparent. The expression comprises a $v binding which is a LET binding. The expression "says" that for the predicate "$v /b='b' and $v /c='c'" the "b" and "c" matches are under a sequence of one or more "v" matches. Document 3 in FIG. 6 should now qualify because "$b_1$" and "$c_1$" are under a sequence of "$v_1$" nodes under an "$x_1$," and "$a_2$" is under the same "$x_1$." When applied to the XPath query, the XML pivot join procedure properly skipped Document 3 because "$b_1$" and "$c_1$" for Document 3 are not under the same "$v_1$" node. However, when applied to the XQuery FLWOR expression, Document 3 is improperly skipped.

From the foregoing discussion, Applicants assert that a need exists for a method and apparatus that properly handles a LET binding used in a WHERE clause of an XQuery FLWOR expression during an XML pivot join procedure.

SUMMARY OF THE INVENTION

The present invention has been developed in response to the present state of the art, and in particular, in response to the problems and needs in the art that have not yet been fully solved by currently available LET binding handling techniques. Accordingly, the present invention has been developed to provide an apparatus and method for handling a LET binding used in a WHERE clause of an XQuery FLWOR expression during an XML pivot join procedure.

The apparatus to handle a LET binding used in a WHERE clause of an XQuery FLWOR expression during an XML pivot join procedure is provided with a plurality of modules configured to functionally execute the necessary handling steps. These modules in the described embodiments include an identification module, a link module, a truncation module, and a return module.

The apparatus, in one embodiment, is configured to identify a series of XPath steps under a LET binding of an XQuery FLWOR expression. The LET binding includes a context step that establishes an origination point for the XPath step's traversals down an XML tree. The link module traverses up the XML tree from the terminal point of the XPath steps attempting to locate a first non-LET binding ancestor or Root Step that is common to all XPath steps under the LET binding of the WHERE clause of the XQuery FLWOR expression.

The truncation module truncates the location identifiers of each XPath step to the location identifier of the located first common non-LET binding ancestor or Root Step. The return module returns an XML document if the truncated location identifier matches at a first common FOR binding of the XQuery FLWOR expression. Similar to the LET binding, the FOR binding is an association of a variable to a value in an expression, but the variable is part of the FOR clause. If the truncated location identifier does not match at a first common FOR binding of the XQuery FLWOR expression, then the XML document is not returned.

A method of the present invention is also presented for handling a LET binding used in a WHERE clause of an XQuery FLWOR expression. The method in the disclosed embodiments substantially includes the steps necessary to carry out the functions presented above with respect to the operation of the described apparatus. In one embodiment, the method includes identifying a series of XPath steps, linking bindings under the LET binding to a first common non-LET binding ancestor, truncating a location identifier of each XPath step, and returning a qualifying XML document.

Identifying a series of XPath steps may include identifying the LET binding of the XQuery FLWOR expression and the steps associated with it. The LET binding may include a context step that indicates the originating location of the XPath steps. Linking bindings under the LET binding to a first common non-LET binding ancestor may include utilizing the match graph phase of the XML pivot join procedure. The XPath steps terminate at a terminal location in a paths tree, which is a structure generated during the XML pivot join procedure representing every unique path of a collection of XML documents. A query tree, which is a tree representation of the query, is another structure created during the XML pivot join procedure. Linking bindings may also include utilizing a match graph, which is also created during the XML pivot join procedure by combining matches in the paths tree and the query tree, and traversing from the terminations of the XPath steps back up to a first common non-LET binding ancestor.

Truncating the location identifier for each XPath step includes comparing the location identifier of the XPath step with the location identifier of the first common non-let binding ancestor. The location identifier for each XPath step is truncated to be identical to the location identifier of the first common non-LET binding ancestor. Returning the XML document includes ascertaining if the truncated location identifier of the XPath steps matches a first common FOR binding of the XQuery FLWOR expression. If the location identifiers match, then the XML document is returned; but if the location identifiers do not match, then the XML document is not returned.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
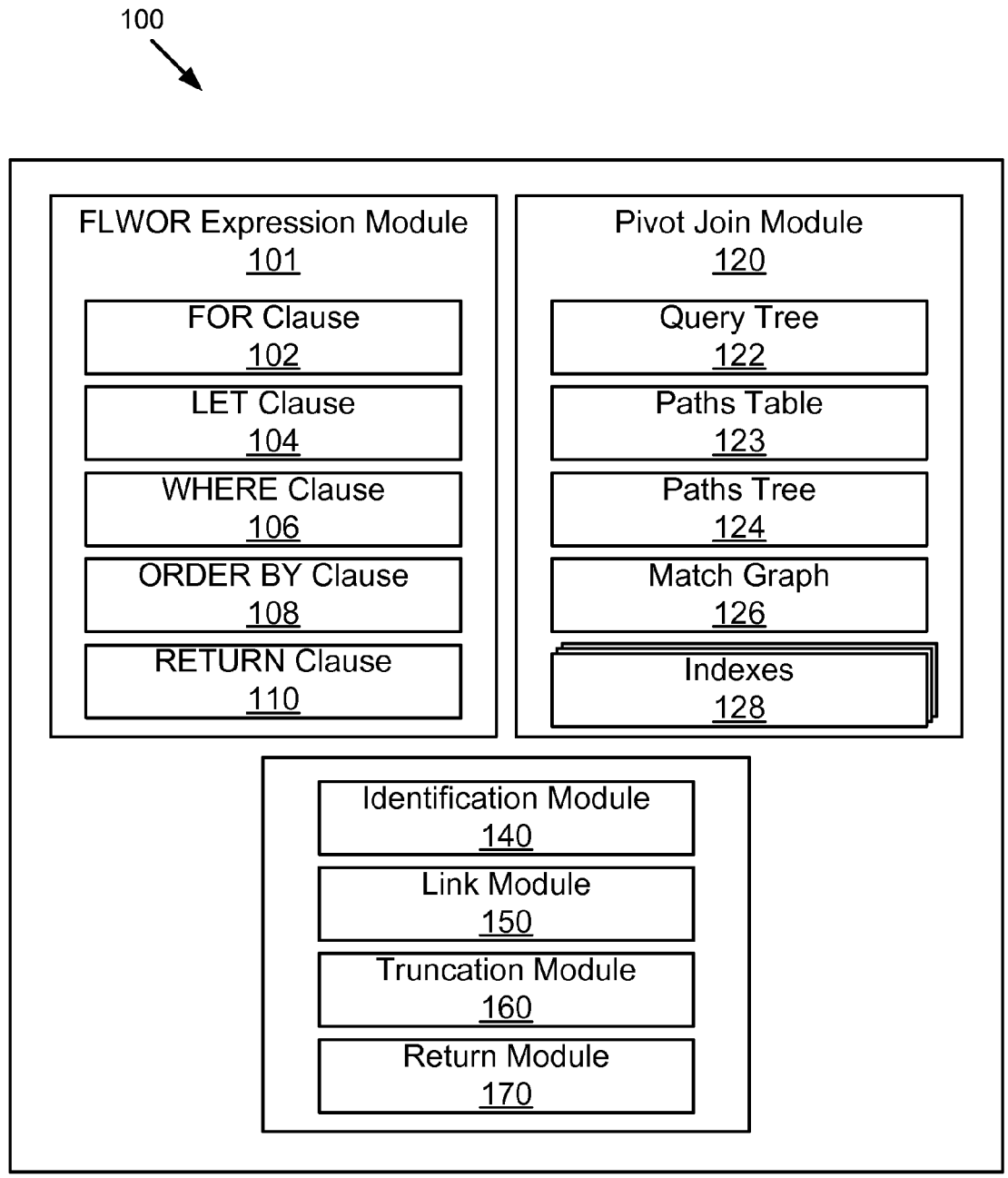
FIG. 1 is a schematic block diagram illustrating one embodiment of an environment for handling a LET binding used in a WHERE clause of an XQuery FLWOR expression during an XML pivot join in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts an apparatus for handling a LET binding used in a WHERE clause of an XQuery FLWOR expression during an XML pivot join procedure. The apparatus 100 includes a FLWOR expression module 101, a pivot join module 120, an identification module 140, a link module 150, a truncation module 160, and a return module 170. The depicted apparatus 100 facilitates handling a LET binding of an XQuery FLWOR expression during an XML pivot join procedure.

The FLWOR expression module 101 may include modules corresponding to a FOR clause 102, a LET clause 104, a WHERE clause 106, an ORDER BY clause 108, and a RETURN clause 110. In one embodiment, the FLWOR expression module 101 provides clauses that support iteration and binding of variables to intermediate results. The FLWOR expression module 101 is often useful for computing joins between two or more documents and for restructuring data.

The FOR clause module 102 may bind one or more variables. In one embodiment, the purpose of a FOR clause in an XQuery FLWOR expression module 101 is to produce a tuple stream in which each tuple consists of one or more bound variables. The simplest example of a FOR clause may contain one variable and an associated expression. The value of an expression associated with a variable in a FOR clause is called the binding sequence for that variable. The FOR clause module 102 may iterate over the items in the binding sequence, binding the variable to each item in turn.

When multiple variables are present, each variable may have an associated expression whose value is the binding sequence for that variable; in this case, the FOR clause module iterates each variable over its binding sequence. The resulting tuple stream contains one tuple for each combination of values in the respective binding sequences.

Like the FOR clause module 102, the LET clause module 104 may bind one or more variables. One purpose of the LET clause is to produce a tuple stream in which each tuple consists of one or more bound variables. However, unlike the FOR clause module 102, the LET clause module 104 may bind each variable to the result of its associated expression, without iteration. In one embodiment, the variable bindings generated by the LET clause are added to the binding tuples generated by the FOR clause. If there are no FOR clauses, the LET clause may produce one tuple containing all the variable bindings. Although the FOR clause module 102 and the LET clause module 104 both bind variables, the manner in which variables are bound is different.

The WHERE clause module 106 may be optional. The WHERE clause may serve as a filter for the tuples of variable bindings generated by the FOR clause and the LET clause. In one embodiment, an expression in the WHERE clause is evaluated once for each of these tuples. If the effective boolean value of the expression in the WHERE clause is true, the tuple may be retained and its variable bindings may be used in an execution of the RETURN clause module 110. If the effective boolean value of the expression in the WHERE clause is false, the tuple may be discarded.

The RETURN clause of the XQuery FLWOR expression may be evaluated once for each tuple in the tuple stream, and the results of these evaluations may be concatenated to form the result of the XQuery FLWOR expression module 101. If the ORDER BY clause is not present, the order of the tuple stream may be determined by the FOR clause and the LET clause. If the ORDER BY clause is present, it may reorder the tuples in the tuple stream into a new, value-based order. In either case, the resulting order may determine the order in which the RETURN clause is evaluated; once for each tuple, using the variable bindings in the respective tuples.

For more information regarding the XQuery FLWOR expression and the FLWOR clauses, refer to the W3C publication, *XQuery 1.0: An XML Query Language*, currently located online at http://www.w3.org/TR/xquery/.

The pivot join module 120 may provide for efficient filtering of XML documents satisfying either an XPath query or XQuery expression. In one embodiment, the pivot join module 120 uses a query tree 122, a paths table 123, a paths tree 124, a match graph 126, and XML indexes 128 to filter XML documents. From an XQuery FLWOR expression, the pivot join module 120 generates a query tree 122.

The paths table 123 may be created to describe every unique path in the collection of XML documents. The paths table 123 may include paths that are both relevant and non-relevant to the query. In one embodiment, to summarize the relevant paths, a paths tree 124 is created. In order to sort the relevant paths from the non-relevant paths, both the query tree 122 and paths table 123 may be utilized to create the paths tree 124. Entries from the paths table 123 may be matched against the query tree 122 to identify qualifying paths which are combined to form the paths tree 124. A match graph 126 may be constructed by finding paths in the paths tree 124 that match steps in the query tree 122. These structures are used at strategic points throughout the pivot join module 120 to identify qualifying documents.

XML indexes may include entries which are derived from each linear XPath in the XPath query or XQuery expression. Each index entry includes a path, which is the unique path that matched the linear XPath; a value, which is the value of the last document node in the path; a document identifier, which is the document identifier of the XML documents that contains the path; and a node identifier, which is the identifier of the node in the XML document that is in the path. There may be one XML index for each linear XPath. As a result, each particular XML index will comprise entries satisfying the corresponding linear XPath. In one embodiment, the XML indexes are logically "AND"ed together to facilitate evaluation.

The identification module 140 may be configured to identify the LET binding of the LET clause 104. In one embodiment, the identification module 140 is configured to identify the XPath steps relating to the XQuery FLWOR expression. A step may be a part of a path expression that generates a sequence of items and then filters the sequence by zero or more predicates. A predicate may include an expression enclosed in square brackets. So, the XPath steps may be identified by examining the query or expression to locate components, which generate a sequence of items and then filter the sequence. For example, in the XQuery "for $a in doc( )/ //a LET $b in $a//b WHERE $b/c=5 and $b/d=6 RETURN $a;" the "$b/c=5" and "$b/d=6" components are both XPath steps.

The identification module 140 may also be configured to identify a context step of the XQuery expression. The context step is the step currently being processed. In one embodiment, the LET bindings are used as context steps in the WHERE clause. The match graph 126 may be represented by a tree structure. The XPath steps may lead down the tree structure of the match graph. The link module 150 may traverse back up through the tree structure by reversing the downward path.

In one embodiment, the link module 150 traverses upward until locating the first common non-LET binding ancestor of the context step. There is great significance in locating the first common non-LET binding ancestor. The XPath steps that traverse down the match graph 126 originate from at least one context step. The context step may be a LET binding. If traversing back up through the match graph only locates the context step or LET binding, the current problem of erroneously excluding a document would still occur.

Figure 6:
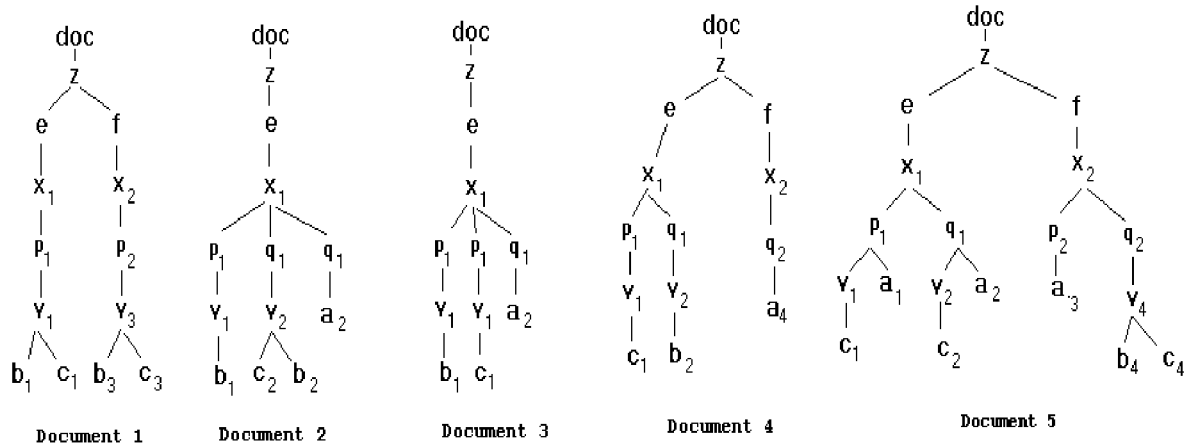
FIG. 6 is a diagram representing a collection of XML documents used in an XML pivot join procedure.
Figure 7:
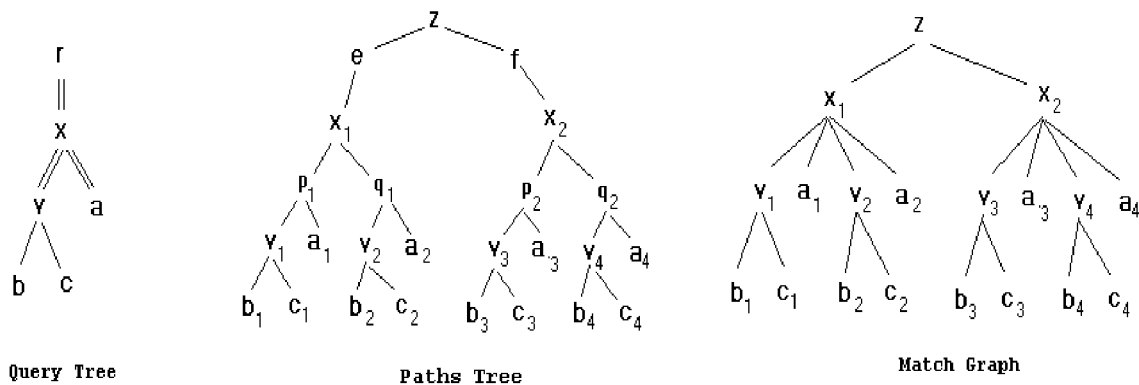
FIG. 7 is a diagram of a query tree, paths tree, and resulting match graph created in an XML pivot join procedure.
Figure 8:
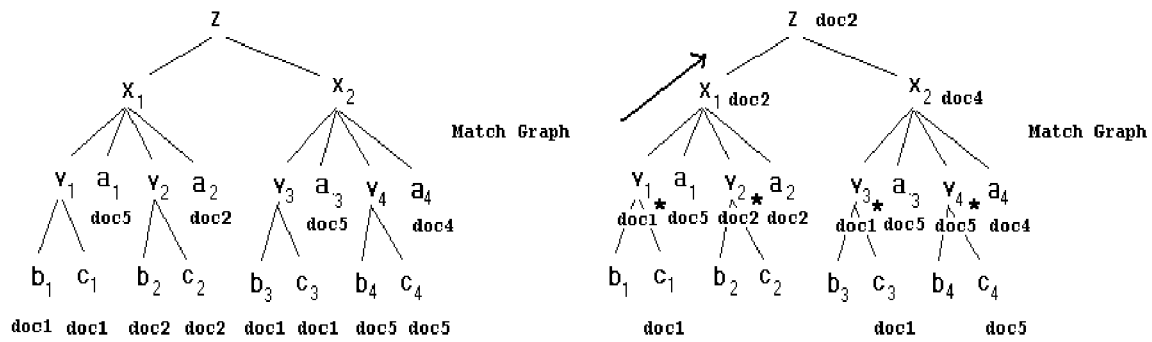
FIG. 8 is a diagram representing the functionality of the match graph during the XML pivot join procedure.
Figure 9:
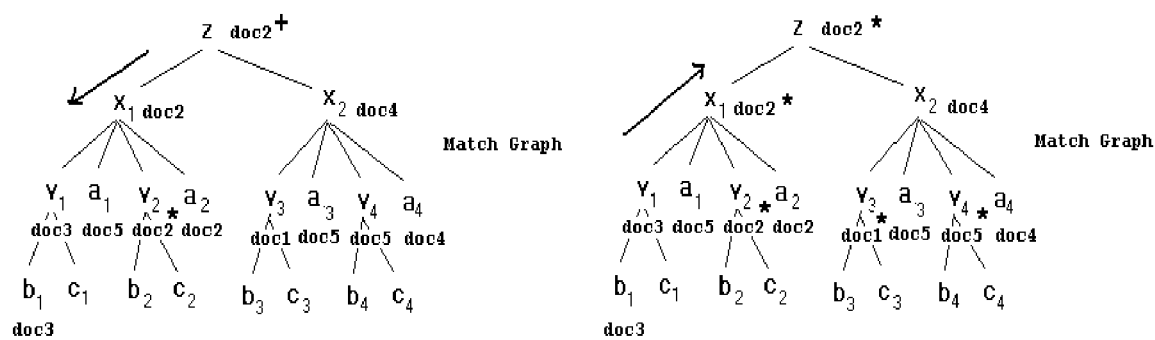
FIG. 9 is a diagram representing the functionality of the match graph during the XML pivot join procedure.
Figure 10:
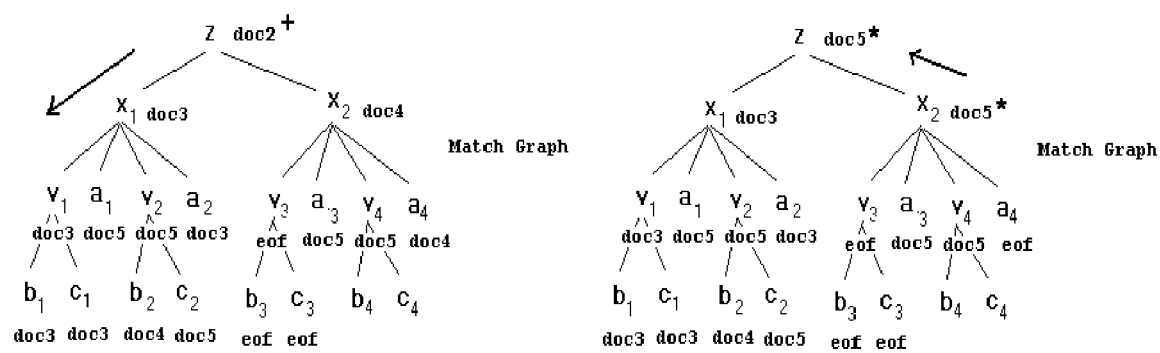
FIG. 10 is a diagram representing the functionality of the match graph during the XML pivot join procedure.

For example, given the XQuery FLWOR expression "for $x in doc( ) //x LET $v in $x //v WHERE $v /b='b' and $v /c='c' and $x //a='a' RETURN $x;" the result should return XML documents with "b" and "c" matches under a sequence of one or more "v" matches (provided all other components are satisfied). But, if the first common non-LET binding ancestor is not located, then the result would only return XML documents with "b" and "c" under one "v" match (provided all other components are satisfied). Given Document 3 in FIG. 6, the first common non-LET binding ancestor is "$x_1$" because it is the first ancestor common to the XPath steps terminating at "$b_1$" and "$c_1$" that is not a LET binding.

Figure 11:
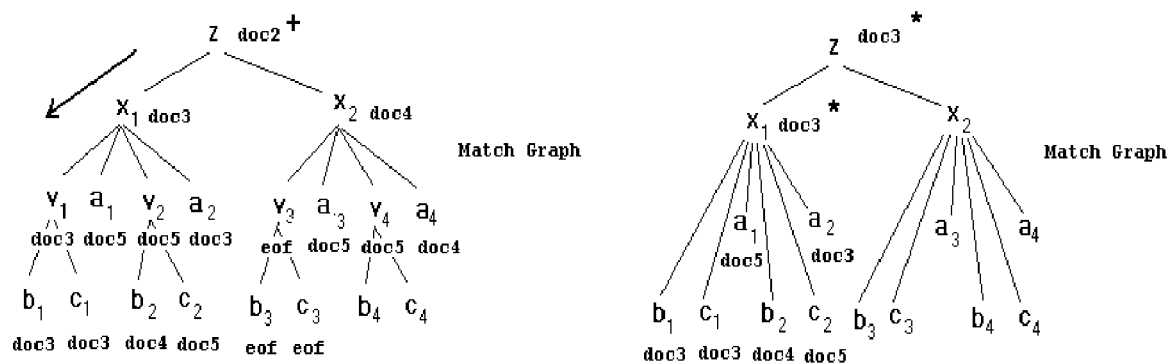
FIG. 11 is a diagram representing a modified match graph used to locate a first common non-LET binding ancestor or Root Step in accordance with the present invention.

In this instance, the first common non-LET binding ancestor is the FOR binding. In one embodiment, the truncation module 160 identifies a location identifier for the first common non-LET binding ancestor. The location identifier may be the node identification. The truncation module may truncate the location identifier for each XPath step to the location identifier of the first common non-LET binding ancestor. The truncation module may create a modified match graph as shown in FIG. 11 where the locations of "$b_1$," "$c_1$," and "$a_2$," to the "$x_1$" level in the match graph on the right of FIG. 11, which will result in a matching node identification at "$x_1$."

The return module 110 may compare either the location identifier of the first common non-LET binding ancestor or the truncated location identifier and a location identifier of a first common FOR binding of the XQuery FLWOR expression. If the location identifiers match, the return module may return the qualifying document. Document 3 of FIG. 6 may now be returned because there is a "$b_1$" path, a "$c_1$" path, and an "$a_2$" path under the same "$x_1$," even though "$b_1$" and "$c_1$" are under different "v" nodes under the same "$x_1$." The first common non-LET binding ancestor is "$x_1$" and the first common FOR binding is also "$x_1$."

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
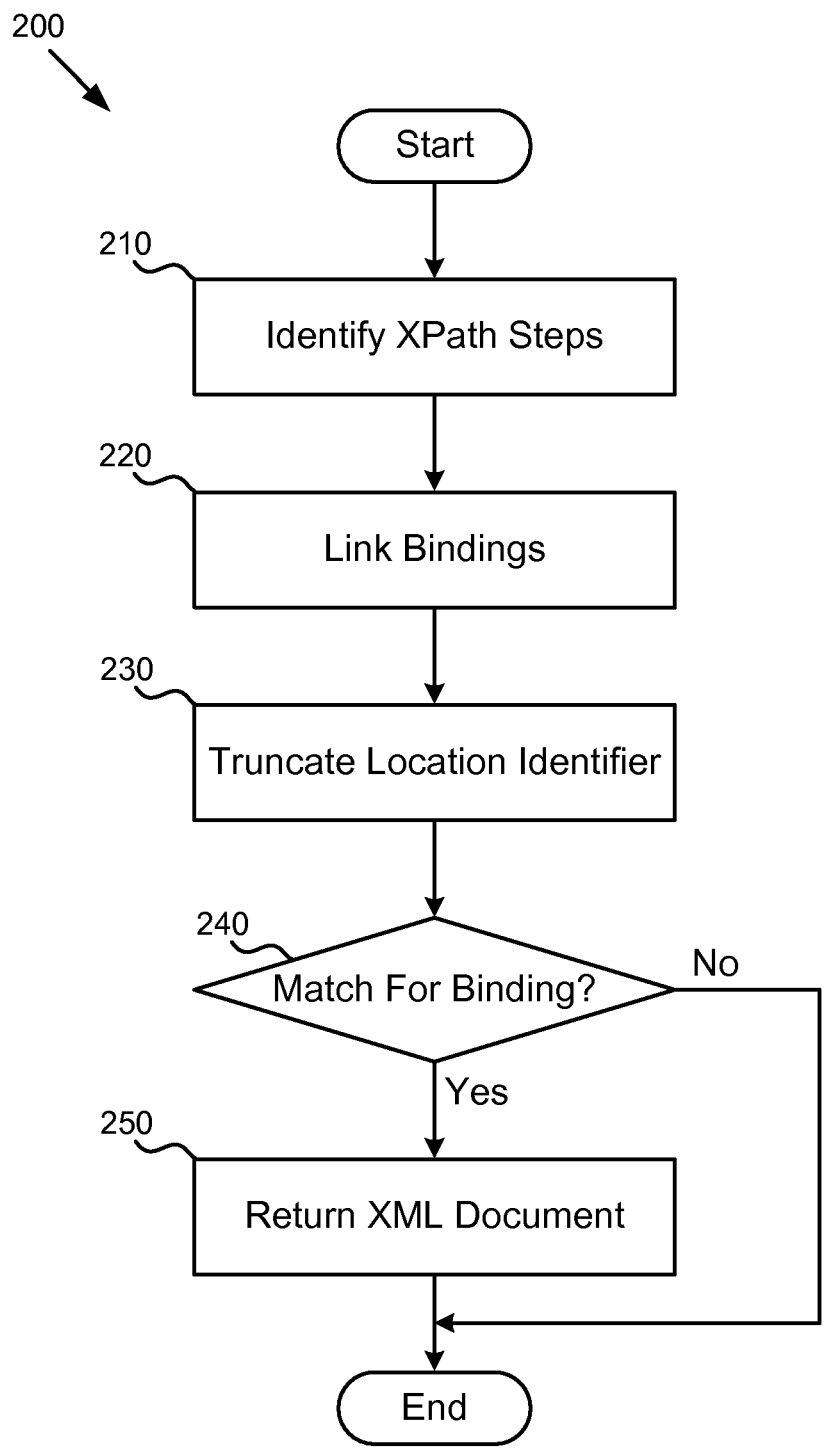
FIG. 2 is a flow chart diagram illustrating one embodiment of a method for handling a LET binding used in a WHERE clause of an XQuery FLWOR expression during an XML pivot join.
Figure 3:
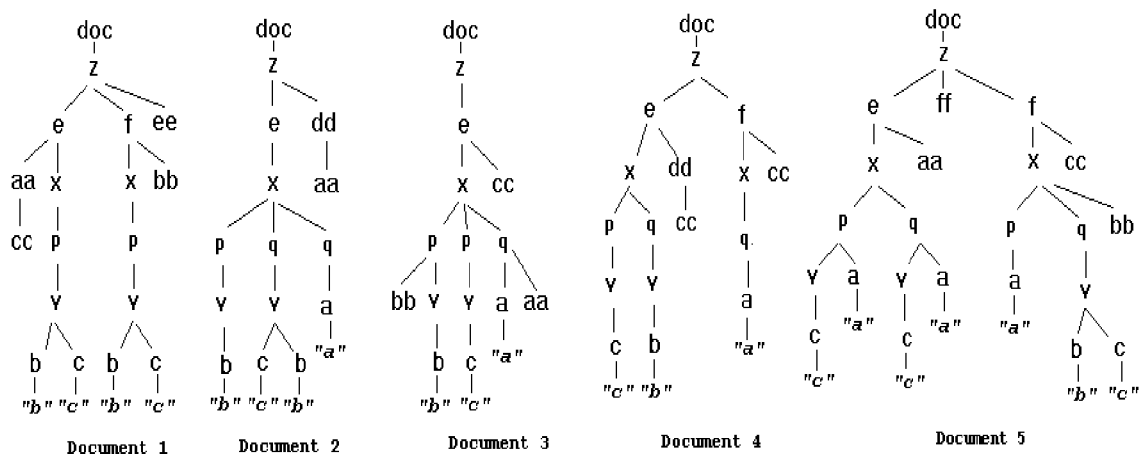
FIG. 3 is a diagram representing a collection of XML documents used in an XML pivot join procedure.
Figure 4:
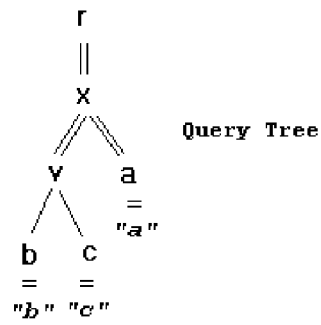
FIG. 4 is a diagram representing a query tree, paths table, and paths tree created during an XML pivot join procedure.
Figure 4:
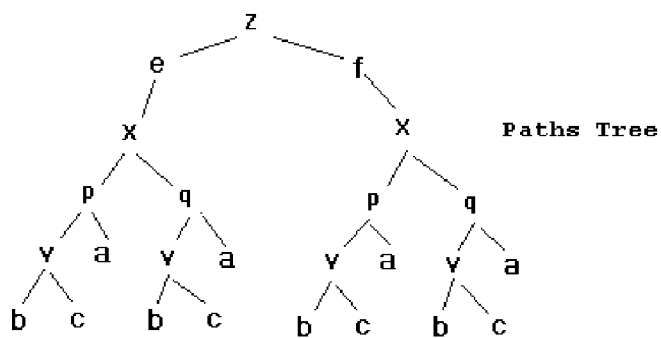
Figure 5:
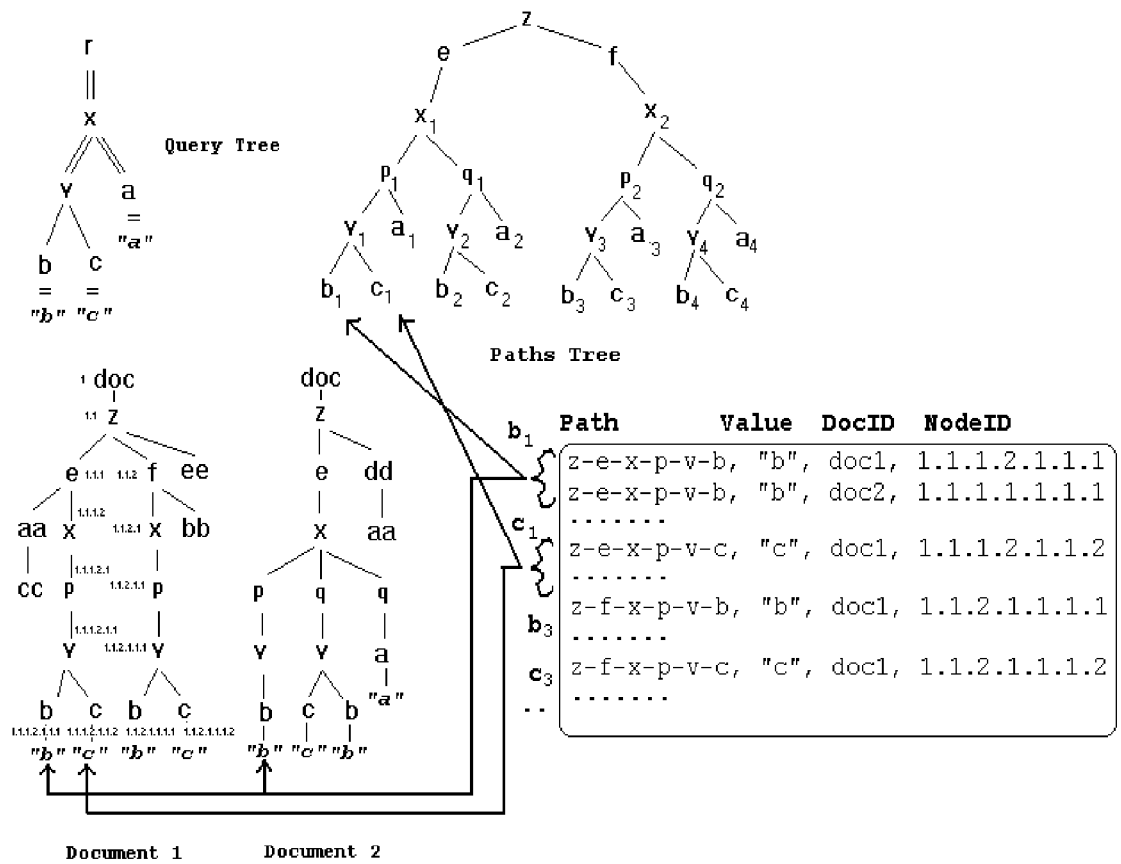
FIG. 5 is a diagram illustrating the working relationship of the query tree, paths tree, and XML documents.

FIG. 2 depicts a schematic flow chart diagram illustrating one embodiment of handling a LET binding of an XQuery FLWOR expression during an XML pivot join procedure in accordance with the present invention. The method 200 includes identifying 210 XPath steps, linking 220 one or more bindings, truncating 230 a location identifier, ascertaining 240 if the location identifier matches at a first common FOR binding, and returning 250 an XML document. The depicted method 200 facilitates handling a LET binding of an XQuery FLWOR expression during an XML pivot join procedure in accordance with the present invention.

Identifying 210 XPath steps may include identifying the LET binding of the LET clause. In one embodiment, identifying 210 XPath steps includes identifying XPath steps relating to the XQuery FLWOR expression. Identifying 210 XPath steps may include identifying a context step of the XQuery expression.

Linking 220 one ore more bindings may include traversing up through the tree structure of the match graph to the first common non-LET binding ancestor. The first common non-LET binding ancestor is the first ancestor reached, while traversing up through the tree structure that is common to the XPath steps being linked but is not a LET binding. For example, the first non-LET binding ancestor may be a FOR binding.

Truncating 230 a location identifier may include identifying the location identifier of the first common non-LET binding ancestor. The location identifier may be a hierarchical node that is used to identify the location of the node in the tree structure of the match graph. In one embodiment, truncating 230 a location identifier includes truncating every XPath step to the location identifier of the first common non-LET binding ancestor.

Ascertaining 240 if the location identifier matches at a first common FOR binding, when traversing a tree structure from the bottom up, may include comparing the location of the first common non-LET binding ancestor to the location of one first common FOR binding. In one embodiment, ascertaining 240 if the location identifier matches at a first common FOR binding includes comparing the truncated location of the XPath steps to the location of one first common FOR binding ancestor. If the location identifiers match, then the method advances to returning 250 the qualifying XML document. If the location identifiers do not match, then the method does not return the XML document because it does not qualify.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable storage medium having computer readable program code programmed to perform handling of a LET binding during an XML pivot join procedure, the computer program product having operations comprising:

traversing down a path summary tree generated during the XML pivot join procedure, wherein the path summary tree is configured to summarize all unique paths of an XML document;

identifying a series of XPath steps under a LET binding of an XQuery "FOR, LET, WHERE, ORDER BY, and RETURN" ("FLWOR") expression, wherein the LET binding is an association of one or more variables to one or more values in the FLWOR expression, the LET binding comprising a context step in a WHERE clause within the XQuery FLWOR expression;

traversing up a path matching graph to locate a first common non-LET binding ancestor of the series of XPath steps, wherein the first common non-LET binding ancestor comprises a first ancestor reached while traversing up the path matching graph that is common to the series of XPath steps and is not a LET binding;

linking bindings under the LET binding to the first common non-LET binding ancestor within the path matching graph during a path matching phase of the XML pivot join procedure, wherein the bindings under the LET binding are identified by the series of XPath steps;

truncating a location identifier for each XPath step in the series of XPath steps to a location identifier of the first common non-LET binding ancestor within an XML document to provide a truncated location identifier, wherein the location identifier for each XPath step is truncated to be identical to the location identifier of the first common non-LET binding ancestor; and returning the XML document if the truncated location identifier matches a first common FOR binding of the XQuery FLWOR expression.

2. The computer program product of claim 1, wherein the operations further comprise not returning the XML document if the truncated location identifier does not match at the first common FOR binding of the XQuery FLWOR expression.

3. An apparatus for handling of a LET binding during an XML pivot join, the apparatus comprising:

an identification module stored on a memory and executed by a processor, the identification module configured to traverse a path summary tree generated during the XML pivot join procedure, wherein the path summary tree is configured to summarize unique paths of the XML document;

the identification module further configured to identify a series of XPath steps under a LET binding of an XQuery "FOR, LET, WHERE, ORDER BY, and RETURN" ("FLWOR") expression, wherein the LET binding is an association of one or more variables to one or more values in the FLWOR expression, the LET binding comprising a context step in a WHERE clause within the XQuery FLWOR expression;

a link module configured to traverse up a path matching graph to locate a first common non-LET binding ancestor of the series of XPath steps, wherein the first common non-LET binding ancestor comprises a first ancestor reached while traversing up the path matching graph that is common to the series of XPath steps and is not a LET binding;

the link module further configured to link bindings under the LET binding to the first common non-LET binding ancestor within the path matching graph during a path matching phase of the XML pivot join procedure, wherein the bindings under the LET binding are identified by the series of XPath steps;

a truncation module configured to truncate a location identifier for each XPath step in the series of XPath steps to a location identifier of the first common non-LET binding ancestor within the XML document to provide a truncated location identifier, wherein the location identifier for each XPath step is truncated to be identical to the location identifier of the first common non-LET binding ancestor; and a return module configured to return the XML document if the truncated location identifier matches a first common FOR binding ancestor of the XQuery FLWOR expression.

4. The apparatus of claim 3, wherein the return module is further configured to not return the XML document if the truncated location identifier does not match at the first common FOR binding ancestor of the XQuery FLWOR expression.

* * * * *